United States Patent [19]
Bundgaard

[11] Patent Number: 5,137,636
[45] Date of Patent: Aug. 11, 1992

[54] PROCESS FOR THE BIOLOGICAL PURIFICATION OF WASTE WATER

[75] Inventor: Erik Bundgaard, Vanløse, Denmark

[73] Assignee: I. Krüger Systems A/S, Søborg, Denmark

[21] Appl. No.: 623,992

[22] PCT Filed: Jun. 27, 1989

[86] PCT No.: PCT/DK89/00161
§ 371 Date: Dec. 20, 1990
§ 102(e) Date: Dec. 20, 1990

[87] PCT Pub. No.: WO90/00157
PCT Pub. Date: Jan. 11, 1990

[30] Foreign Application Priority Data

Jun. 27, 1988 [DK] Denmark ............................ 3536/88

[51] Int. Cl.⁵ ............................ C02F 3/02; C02F 3/30
[52] U.S. Cl. ..................... 210/605; 210/607; 210/626; 210/630; 210/903
[58] Field of Search ............... 210/605, 607, 622-626, 210/629, 630, 403

[56] References Cited

U.S. PATENT DOCUMENTS

| | | | |
|---|---|---|---|
| 3,964,998 | 6/1976 | Barnard | 210/605 |
| 3,977,965 | 8/1976 | Tholander et al. | 210/903 |
| 4,183,809 | 1/1980 | Klapwijk et al. | 210/903 |
| 4,663,044 | 5/1987 | Goronszy | 210/624 |
| 4,867,883 | 9/1989 | Daigger et al. | 210/605 |

FOREIGN PATENT DOCUMENTS

| | | |
|---|---|---|
| 149767 | 1/1985 | Denmark . |
| 3427310 | 2/1985 | Fed. Rep. of Germany . |
| 163621 | 3/1984 | Japan . |
| 1404565 | 7/1972 | United Kingdom . |

OTHER PUBLICATIONS

Harold A. Nicholls, Prog. Wat. Tech. Vol. 8, Nos. 4/5, pp. 639–652, Pergamon Press 1977, Modification of Extended Aeration Plants in Johannesburg, South Africa, to Achieve Denitrification.
Gert Petersen, Kruger Publication, Nov. 16–18, 1987.

Primary Examiner—Thomas Wyse
Attorney, Agent, or Firm—Rhodes, Coats & Bennett

[57] ABSTRACT

A process and a plant for the purification of waste water wherein the waste water is alternatingly treated in the two treatment zones under anoxic and aerobic conditions and the waste water thus treated is subjected to an aerobic treatment in a separate zone before it is introduced into a clarification zone from which purified waste water and sludge is removed, at least a part of the sludge being recycled to the waste water which is introduced into one of the two treatment zones.

2 Claims, 4 Drawing Sheets

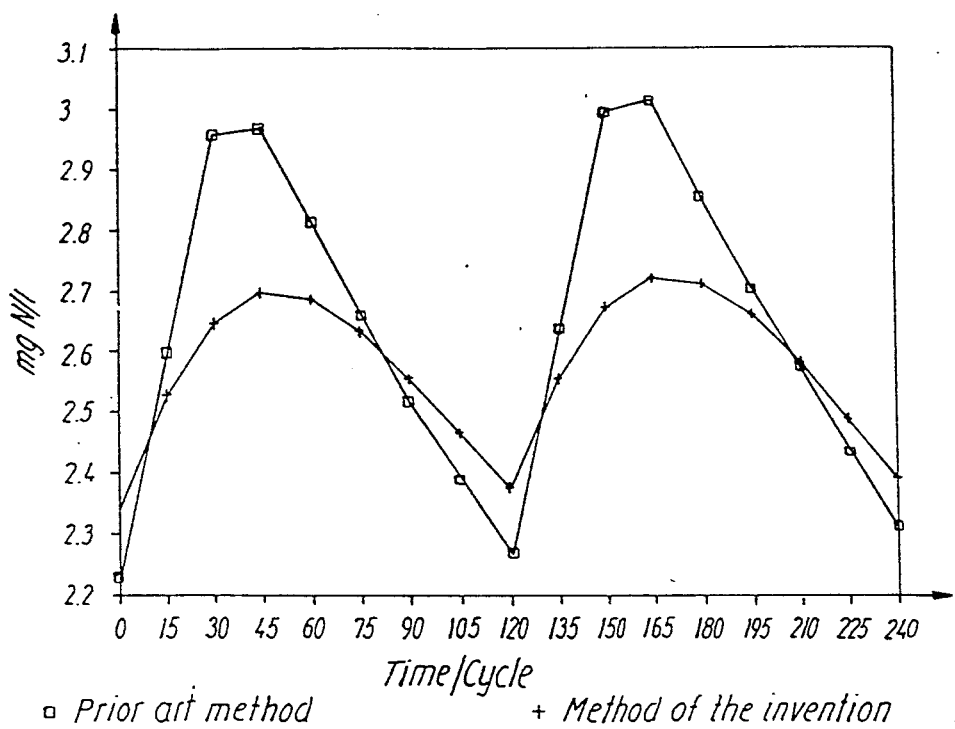
□ Prior art method  + Method of the invention  FIG.3
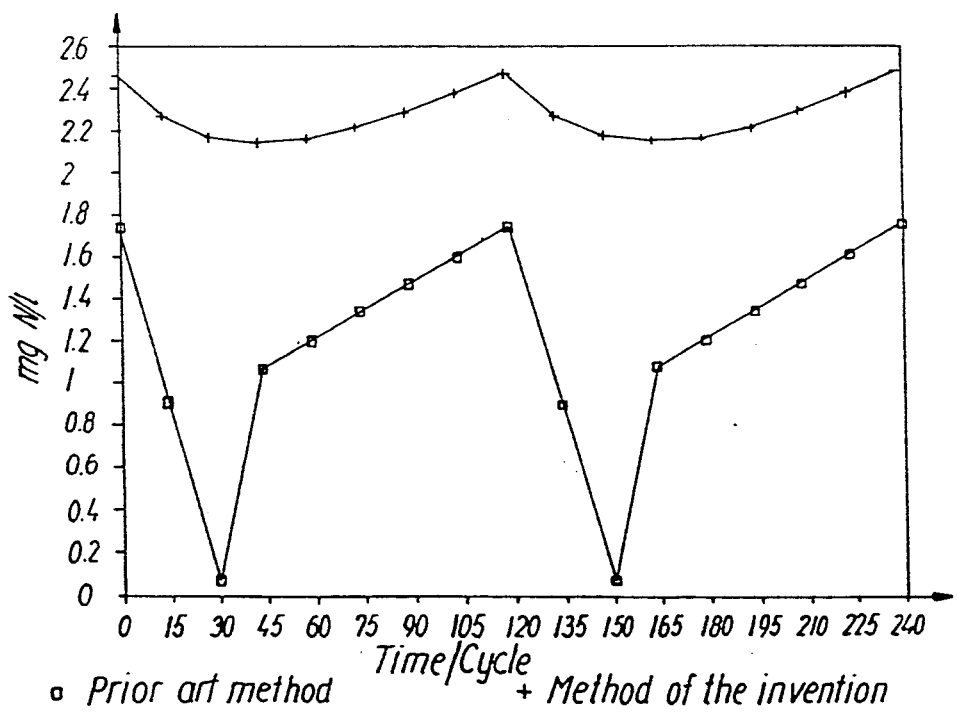
□ Prior art method  + Method of the invention  FIG.4

PROCESS FOR THE BIOLOGICAL PURIFICATION OF WASTE WATER

This invention relates to a process for the biological purification of waste water by the active sludge method, wherein the waste water is contacted with microorganisms in two treatment zones by being alternatingly introduced into said treatment zones and being treated under alternating anoxic and aerobic conditions and wherein the waste water thus treated is introduced into a clarification zone to separate sludge, at least a part of the separated sludge being recycled and mixed with non-treated waste water.

GB patent specification No. 1404565 discloses a process of the above-mentioned type. This prior art process permits an efficient removal of nitrogen at a relatively low energy consumption. The nitrogen removal is based on a nitrification followed by a denitrification.

The nitrification which is effected under aerobic conditions comprises the oxidation of nitrogen in the form of ammonia so as to form nitrate. The nitrification process can be represented as follows:

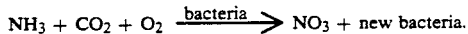
$$NH_3 + CO_2 + O_2 \xrightarrow{bacteria} NO_3 + \text{new bacteria}.$$

The denitrification which is effected under anoxic conditions involves the decomposition of organic matter using nitrate ions as oxidant. As a result of the decomposition nitrate ions are reduced to free nitrogen which is liberated in gaseous form.

The denitrification can be represented as follows:

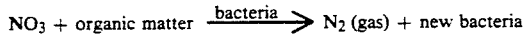
$$NO_3 + \text{organic matter} \xrightarrow{bacteria} N_2 \text{(gas)} + \text{new bacteria}$$

Under aerobic conditions an oxidation of the organic matter contained in the waste water is also effected. This reaction can be represented as follows:

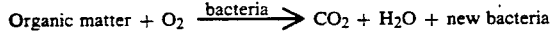
$$\text{Organic matter} + O_2 \xrightarrow{bacteria} CO_2 + H_2O + \text{new bacteria}$$

As mentioned above, nitrification in the presence of organic matter causes the organic matter to decompose. This is inconvenient as organic matter is a prerequisite for carrying out the denitrification.

As will appear from the above, the bacterial processes in question are processes wherein the bacteria use carbon for their reproduction which carbon is supplied by $CO_2$ in the nitrification process and in the two other processes by the carbonaceous material contained in the crude waste water.

The above described biological purification process has been further developed as described in DE patent application No. 3427310.7. In this purification method the waste water is contacted with microorganisms in a first treatment zone under anaerobic conditions before it is subjected to alternating anoxic and aerobic conditions and the sludge from the clarification zone is recycled to the first treatment zone.

Apart from an efficient nitrogen removal such process affords satisfactory phosphorus removal.

The phosphorus removal is caused by the activity of two types of bacteria, viz:
(a) phosphorus accumulating bacteria, and
(b) non-phosphorus accumulating bacteria.

During the anaerobic treatment of the waste water the phosphorus accumulating bacteria containing accumulated polyphosphate absorbs the low molecular organic matter which is stored, e.g. as polyhydroxy butyrate (PHB), the relatively energy rich polyphosphate being used as an energy source. This results in the formation of orthophosphate ions which are liberated to the aqueous medium in the anaerobic treatment zone.

During the subsequent aerobic treatment of waste water the accumulated and hydrolyzed suspended organic matter is oxidized and the energy thus liberated is used partly for the growth of the microorganisms and partly for the accumulation of orthophosphate ions from the aqueous medium in the phosphate accumulating bacteria in the form of polyphosphate. Thus, dissolved phosphate is removed from the waste water.

It applies to both the above known processes that the waste water introduced into the clarification zone should come from an aerobic treatment zone as an influx from an anoxic zone would result in a relatively high $NH_3$ content in the effluent from the clarification tank.

The practical application of the above known processes requires that ratio of nitrification time to denitrification time is maintained at about 1,67:1 or higher in order to maintain the $NH_3$ concentration in the purified waste water at a desirably low level.

BRIEF DESCRIPTION OF THE DRAWINGS

FIGS. 3, 4, and 5 illustrate comparisons between results of prior art processes and the process of the present invention.

Figure 1:
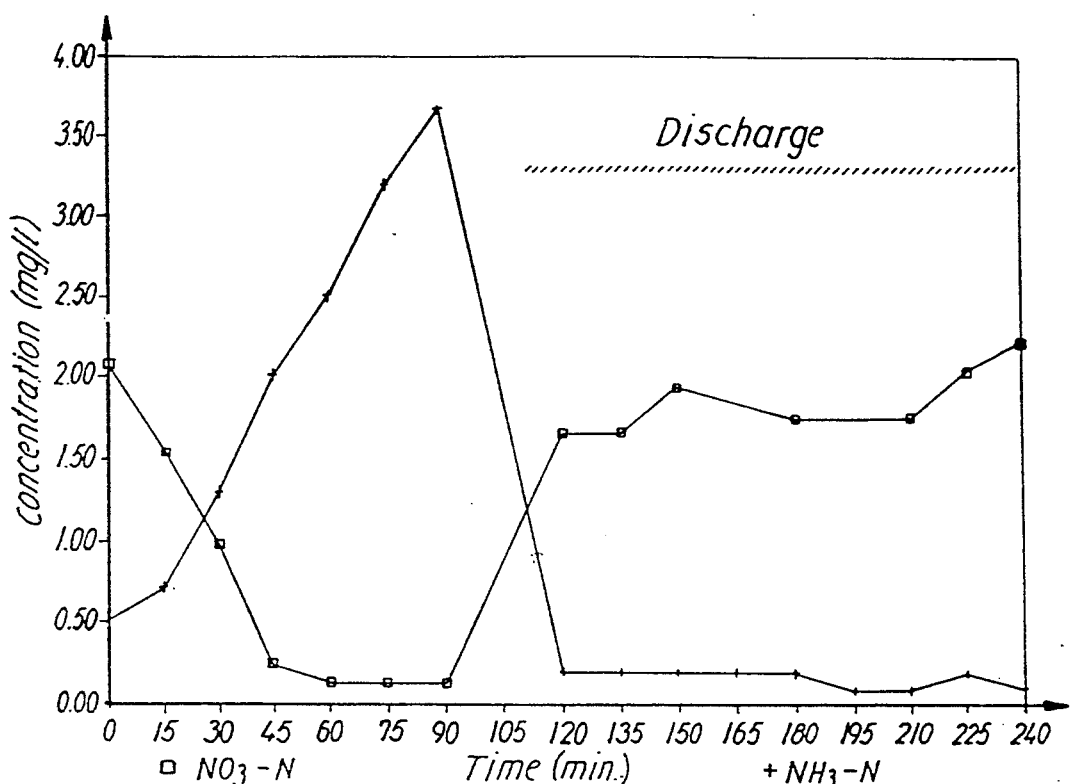
FIGS. 1 and 2 illustrate variations in the ammonia and nitrate concentrations in prior art processes.
Figure 2:
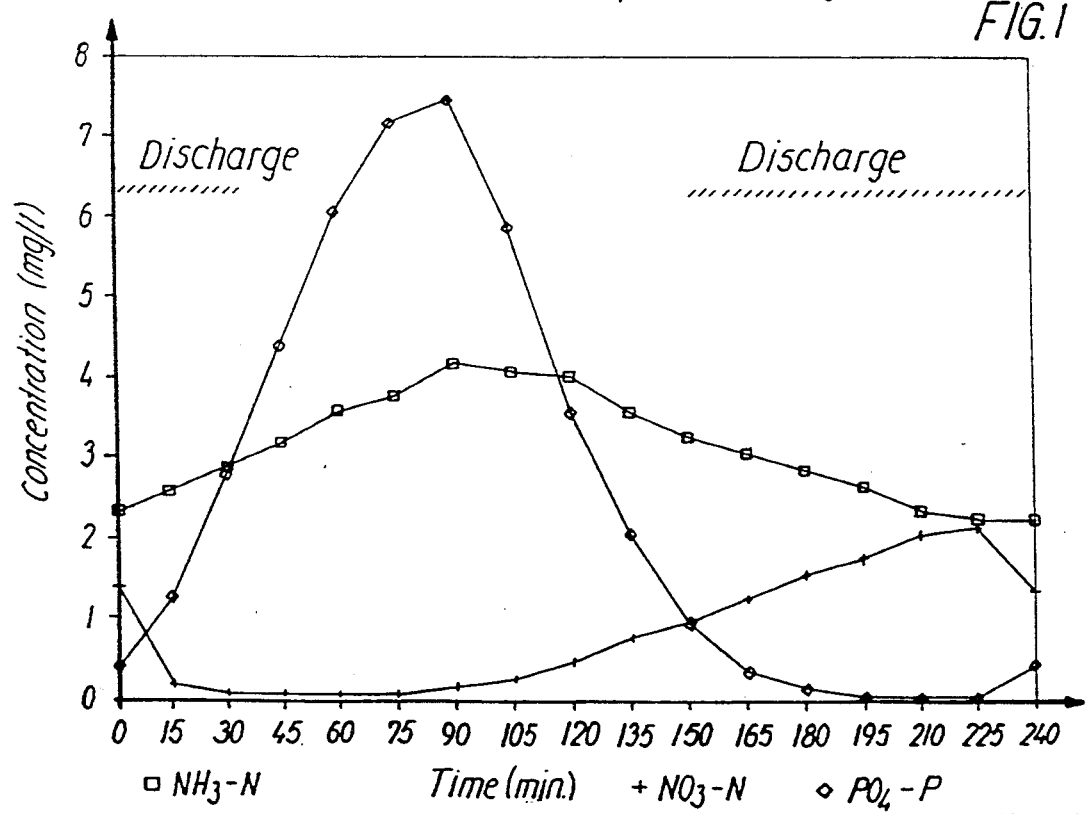

Such a ratio of nitrification time to denitrification time causes relatively drastic variations in the ammonia and the nitrate concentrations in the aerobic treatment zone as will appear from FIG. 1 which shows the variations in the ammonia and nitrate concentrations in the aerobic treatment zone of a plant for carrying out the process according to GB patent No. 1.404.565 over a cycle period of 240 minutes and from FIG. 2 which shows the variations in both the ammonia, the nitrate and the phosphate concentrations in the aerobic treatment zone of a plant for carrying out the process according to DE patent application No. 3427310.7 over a cycle period of 240 minutes.

As will appear from the above, concurrently with a treatment zone being aerated (aerobic treatment of the waste water) in order to obtain nitrification, organic matter is oxidized which oxidation has no effect as regards the purification of the waste water with respect to nitrogen and phosphorus. This oxidation of organic matter is undesirable as it may cause such a reduction in the organic matter content of the waste water that the remaining amounts of organic matter are insufficient for carrying out the subsequent denitrification.

The invention is based on the discovery that the introduction of the waste water which has undergone alternating anoxic and aerobic treatments into a further treatment zone in which it is subjected solely to aerobic treatment before it is passed on to the clarification zone allows for a limitation of the period in which the waste water is treated under aerobic conditions during the alternating anoxic and aerobic treatments in the two treatment zones, and thus presents several advantages, such as an increased utilization of the carbon content of the crude waste water and smaller variations of the ammonia and nitrate concentrations of the purified waste water.

Thus, the process according to the invention is characterized in that the waste water following the alternating anoxic and aerobic treatments in the two treatment zone is passed into an additional treatment zone wherein it is solely subjected to an aerobic treatment before it is introduced into the clarification zone.

As will appear from the above, denitrification is the process in which the actual removal of nitrogen is effected, i.e. by the conversion of nitrate into free nitrogen ($N_2$) which is liberated in gaseous form.

Nitrogen removal requires the presence of nitrate thus presupposing initial nitrification wherein nitrogen in the form in which it ordinarily occurs in waste water, viz. as dissolved ammonia, is converted into nitrate.

If oxygen rich (aerobic) conditions are established in order to obtain a high degree of nitrification (nitrate formation) a concurrent strong oxidation of the organic matter contained in the waste water will be effected and when a subsequent denitrification is to be carried out, shortage of organic matter may occur thus discontinuing the formation of free nitrogen and removal of nitrogen.

Therefore, it is inconvenient that the nitrification is carried out concurrently with the introduction of waste water (containing organic matter) into a treatment zone in the same tank. By subjecting the partially purified waste water to an aerobic treatment following the alternating anoxic and aerobic treatments a nitrification may be carried out smoothly thus affording complete utilization of the organic matter remaining in the waste water for the denitrification.

Such denitrification results in a relatively low and substantially stable ammonia content of the waste water, a somewhat higher but more uniform nitrate content. This will become apparent from FIG. 3 which illustrates the ammonia content and from FIG. 4 which illustrates the nitrate content as a function of time in the outlet of a plant according to GB patent No. 1404565 and of a plant according to the invention.

The process of the invention presents the additional advantage that the ratio of nitrification time to denitrification time can be freely selected thus permitting the denitrification time to constitute more that 50% of the total operation time which is the maximum denitrification time in the known processes. An increase of the denitrification time affords maximum utilization of carbon and at the same time permits discharge from an aerobic treatment zone.

Figure 5:
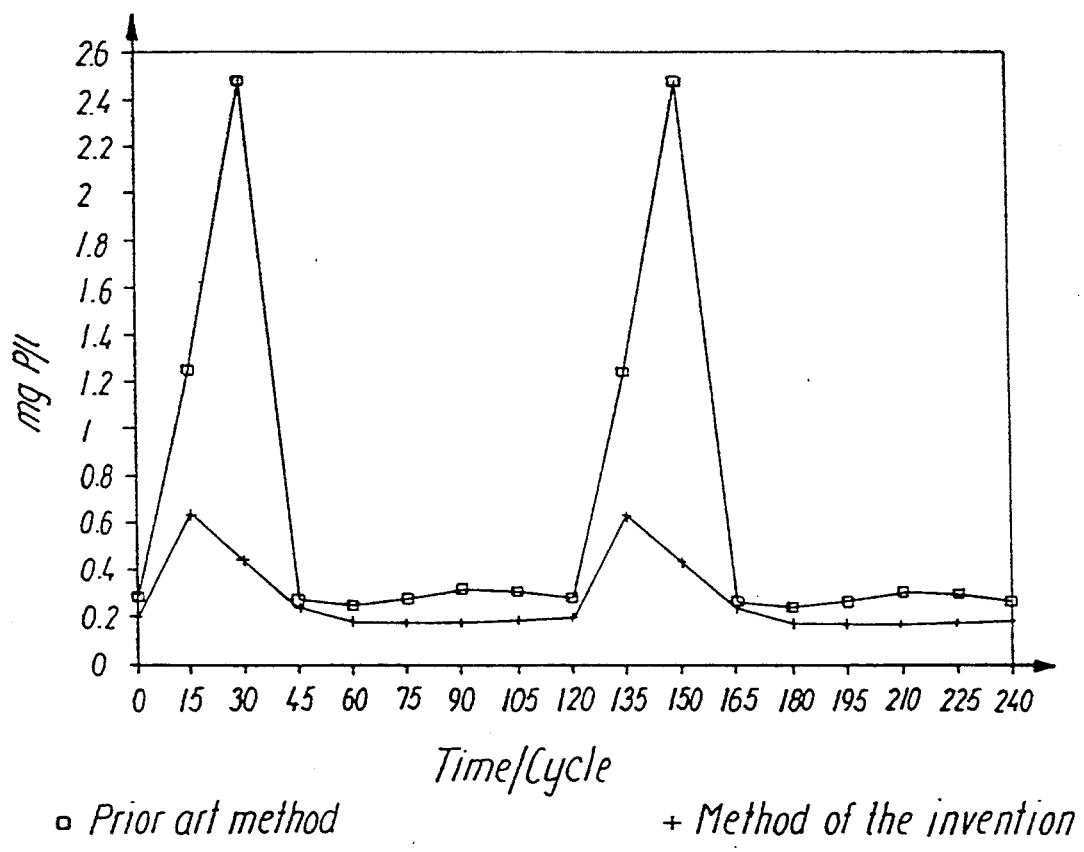

The process according to the invention presents the further technical advantage that the concurrent removal of nitrogen and phosphorus results in a substantially increased reduction of the phosphorus content of the treated waste water. This will appear from FIG. 5 which shows the phosphorus content (in the form of orthophosphate) as a function of time in the outlet a plant according to GB patent No. 1404565 and of a plant according to the invention.

The establishment of aerobic conditions in the additional treatment zone may be effected by methods known per se, e.g. by the introduction of air under pressure into the waste water or by whipping air into the waste water.

The invention further relates to a plant for carrying out the above described process.

The plant according to the invention comprises at least two treatment tanks having means for the transport of waste water from one tank to the other and being constructed so as to establish alternating aerobic and anoxic conditions in each tank, means for alternatingly introducing waste water into the tanks, means for alternatingly passing waste water from the tanks to a clarification tank, and means for recycling sludge from the clarification tank to the waste water which is introduced into a treatment tank, the plant being characterized in that it comprises an additional tank which is connected partly to the two treatment tanks and partly to the clarification tank and constructed so as to permit the establishment of aerobic conditions therein.

A particularly preferred plant according to the invention which is suitable for the removal of both nitrogen and phosphorus from waste water is characterized in that it comprises a further tank having with means for the introduction of waste water into the tank and means for alternatingly passing waste water from the tank to one of the two treatment zones and which is constructed so as to permit the establishment of anaerobic conditions therein.

In the following the invention will be described with reference to FIGS. 6 and 7 which schematically illustrate preferred embodiments of the plant according to the invention.

Figure 6:
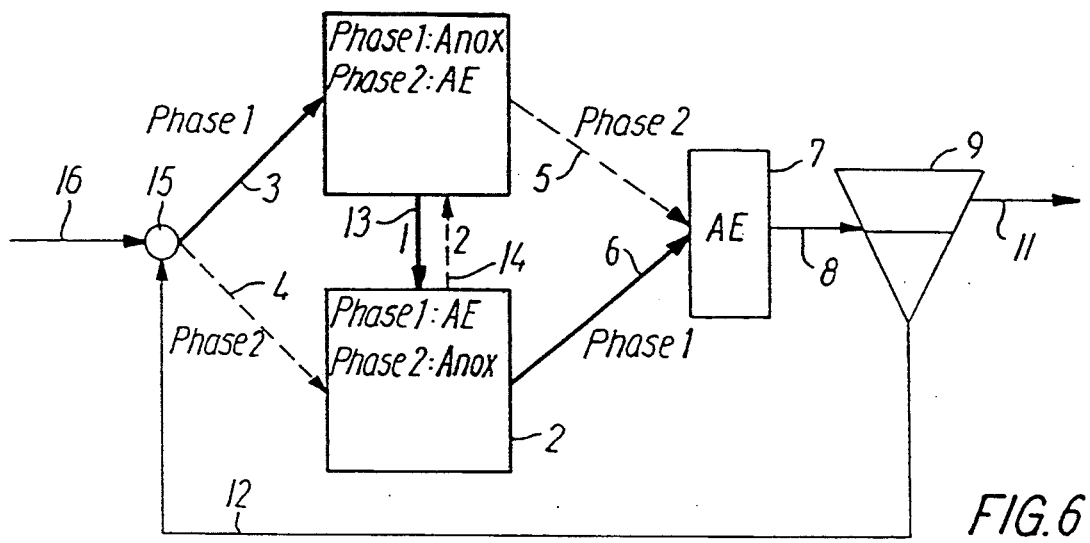
FIGS. 6 and 7 illustrate preferred embodiments of the plant of the present invention.
Figure 7:
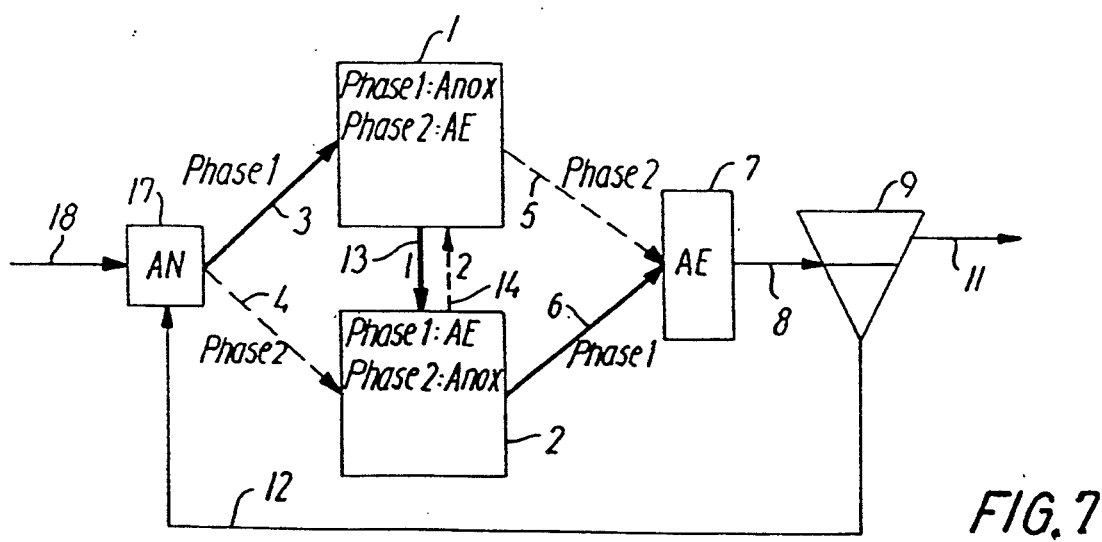

The plants illustrated in FIGS. 6 and 7 comprise two treatment tanks 1 and 2 having conduits 3 and 4 for the introduction of waste water, and conduits 5 and 6 for the discharge of waste water into an additional tank 7. The tank 7 is connected to a clarification tank 9 through a conduit 8, the clarification tank 9 having an outlet conduit 11 for purified waste water and a recycle conduit 12. The treatment tanks 1 and 2 are inter-connected through conduits 13 and 14.

The plant shown in FIG. 6 further comprises a manifold 15 which is connected to the conduits 3 and 4 and a supply conduit 16 for non-treated waste water. The recycle conduit 12 is also connected to the manifold 15.

The plant shown in FIG. 7 comprises an additional treatment tank 17, which like the manifold 15 is connected to a supply conduit 18 for non-treated waste water and which is connected to the conduits 3 and 4 and the recycle conduit 12.

The plant illustrated in FIG. 6 operates as follows:

Non-treated waste water is introduced into the manifold 15 through the supply conduit 16 wherein it is mixed with recycled sludge introduced through the recycle conduit 12. The sludge containing waste water is alternatingly fed into the tanks 1 and 2 through the conduits 3 and 4. In phase 1 the waste water is passed to the tank 1 wherein anoxic conditions are provided. From the tank 1 the waste water is passed through the conduit 13 into the tank 2 wherein aerobic conditions are provided.

In phase 1 waste water is passed from the tank 2 through the conduit 6 to the tank 7 wherein constantly aerobic conditions are maintained. From the tank 7 the treated waste water passes on to the clarification tank 9 wherein a separation of purified waste water, which is removed though the conduit 11, and sludge is effected, at least a part of the sludge being recycled through the conduit 12 to the manifold 15.

In phase 2 waste water is passed from the manifold 15 through the conduit 4 to the tank 2 wherein anoxic conditions are now maintained and further on through the conduit 14 to the tank 1 wherein aerobic conditions are maintained. From the tank 1 the waste water is passed through the conduit 5 to the tank 7 and further on into the clarification tank 9 and it is subjected to the above described treatments in said tanks.

The operation mode of the plant shown in FIG. 7 is identical with that of the plant according to FIG. 6 with the exception that the waste water is subjected to an anaerobic treatment subsequent to its introduction into the tank 17 through the inlet 18 and prior to its introduction thereof into the tank 1 (phase 1) or to the tank 2 (phase 2), and is further treated as described above.

I claim:

1. A process for the biological purification of waste water by the active sludge method, wherein the waste water is contacted with microorganisms in two treatment zones by being alternately introduced into said zones and being treated under alternating anoxic and aerobic conditions, wherein the waste water thus treated is introduced into a clarification zone to separate sludge, at least a part of the separated sludge being recycled and mixed with non-treated waste water, and wherein the waste water following the alternating anoxic and aerobic treatments in the two treatment zones is passed into an additional treatment zone wherein it is solely subjected to an aerobic treatment before it is introduced into the clarification zone.

2. A process according to claim 1, wherein the waste water prior to the alternating anoxic and aerobic treatments in the two treatment zones is introduced into a further treatment zone, wherein it is solely subjected to an anaerobic treatment, and from which further treatment zone the waste water is alternately passed to a first of said two alternating treatment zones.

* * * * *